C. P. ELLIS.
Twine-Cutters.

No. 156,553.

Patented Nov. 3, 1874.

2 Sheets--Sheet 1.

WITNESSES
Jas. L. Ewin
Henry Tanner.

INVENTOR
Charles P. Ellis
By Knight Bro. Attorneys

THE GRAPHIC CO. PHOTO-LITH. 39 & 41 PARK PLACE, N.Y.

2 Sheets--Sheet 2.
C. P. ELLIS.
Twine-Cutters.
No. 156,553.
Patented Nov. 3, 1874.
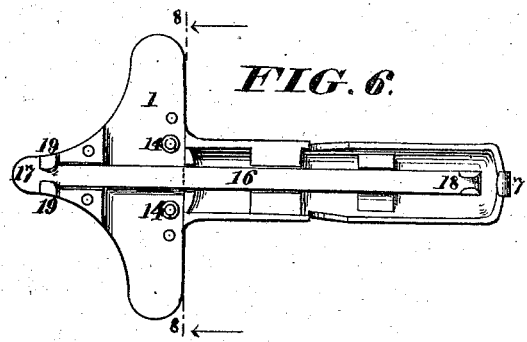
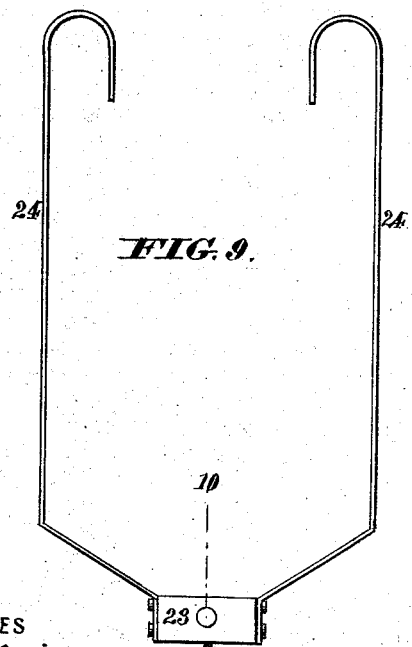
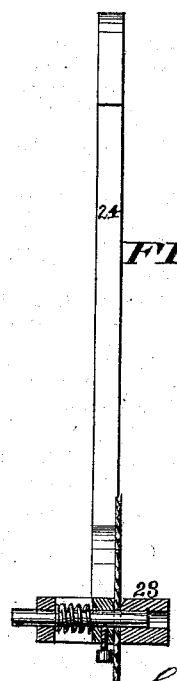
WITNESSES
Jas. L. Ewin
Henry Tanner.
INVENTOR
Charles P. Ellis
By Knight Bros Attorneys
THE GRAPHIC CO. PHOTO-LITH. 39 & 41 PARK PLACE, N.Y.

UNITED STATES PATENT OFFICE.

CHARLES P. ELLIS, OF PARKER CITY, PENNSYLVANIA.

IMPROVEMENT IN TWINE-CUTTERS.

Specification forming part of Letters Patent No. 156,553, dated November 3, 1874; application filed September 21, 1874.

*To all whom it may concern:*

Be it known that I, CHARLES P. ELLIS, of Parker City, in the county of Armstrong and State of Pennsylvania, have invented an Improved Twine-Cutter, of which the following is a specification:

This invention relates to means for cutting or severing the cord or twine used in stores for wrapping and securing packages.

The present invention consists in an improved twine-cutter designed and adapted to remain attached to the cord or twine so as always to be found therewith, and ready for immediate employment, and to be grasped in the hand while in use without danger, and so as to constitute a frictionless guide for the twine as drawn through the hand which is employed in applying it. It also operates to cut the twine at any desired point, so as to save twine by obviating waste ends, as also by preventing the loss or entanglement of the end.

The improved twine-cutter has a holding tension-spring and a knife or knives, which may be fixed or movable, all supported by a convenient stock, which forms guards for the knife or knives, and constitutes a guide for the twine.

A thumb-lever is provided for releasing or more tightly holding the twine at will. This constitutes the subject-matter of the second part of the invention.

The third part of the invention consists in a hinged knife-holder, which provides for operating the knife or knives as shears.

The fourth part of the invention consists in the employment of set-screws, in combination with the hinged knife-holder, and with springs for elevating the knife or knives, the set-screws serving to limit the descent of the knife or knives so as to prevent dulling, or at another adjustment to secure the knife or knives fixedly in elevated position, so as to operate by the application of the twine thereto.

The fifth part of the invention consists in constructing the twine-holder with longitudinal guides and tension devices, in combination with one or more transverse knives.

The device is adapted to be manufactured in a variety of styles; and as preferably made of metal, or like hard material, those parts which would come in contact with the counter are provided with pads or cushions to preclude any marring effect.

Figure 1:
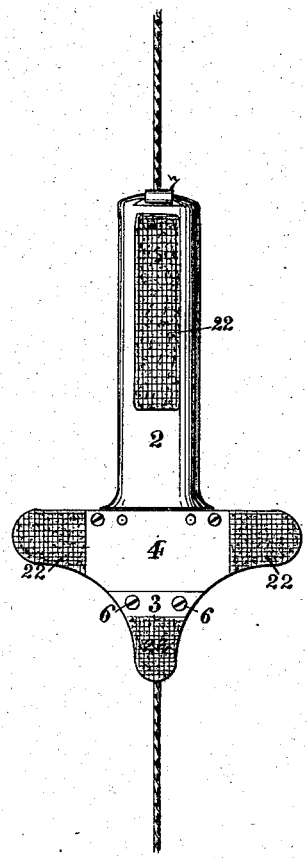
Figure 2:
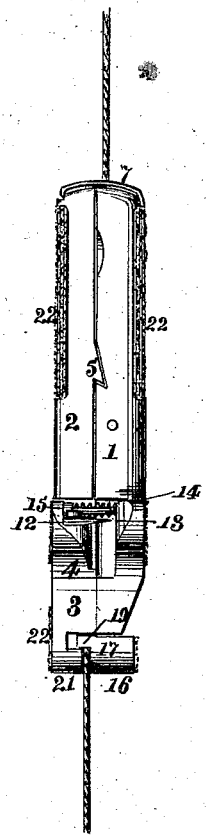
Figure 3:
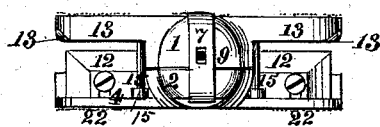
Figure 4:
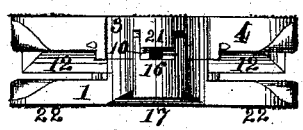
Figure 5:
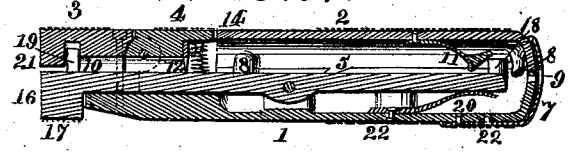

In the accompanying drawing, Figure 1 is an elevation or face view of this improved twine-cutter as attached to a piece of twine. Fig. 2 is an edge view of the same. Fig. 3 is a plan view of the same as held in the position represented in Figs. 1 and 2, and Fig. 4 is a view of the lower end. Fig. 5 is a central longitudinal section of the improved cutter. Fig. 6 is an elevation of the back portion of the cutter as taken apart. Fig. 7 is an elevation of the upper portion of the head of the cutter as detached from the back portion. Fig. 8 is an end view, partly in transverse section, on the line 8 8, Fig. 6, representing the cutter as employed with movable knives. Fig. 9 is an elevation of an accessory which may be applied to an elevated twine-holder to suspend the attached twine-cutter. Fig. 10 is a longitudinal section on the line 10 10, Fig. 9.

The stock of this improved twine-cutter is, by preference, made in three parts, 1 2 3, or in four parts, including a hinged knife-holder, 4. The main part 1, which will be termed the back, is constructed with notches and drill-holes to receive spurs or lugs 5 on the cap-piece 2, and set-screws 6 for attaching the front part 3 of the head. For securing the cap to the back 1 the stock is provided at its upper or receiving end with a spring-catch, 7, and the cap 2 is provided with a notch to receive the end of this catch, and with lugs 8 to project within the back piece 1 as lateral supports. The parts of the stock are recessed to form a continuous central passage for the twine extending from end to end, and the respective ends contain receiving and delivering orifices 9 10. The twine is threaded through these orifices with facility by removing the cap 2. Within the recess of the cap a tension-spring, 11, is attached, and this serves to exert a sufficient pressure upon the twine to prevent the accidental withdrawal of the latter, or the separation of the cutter therefrom. A knife or knives, 12, are arranged transversely with reference to the twine-passage, and within lateral projections, forming parts of the head of the stock. The cutting-points of the knife or knives are arranged at sufficient distances from the discharge end of the stock to insure the leaving of a sufficient length of twine outside of the stock to be taken hold of with facility. Shoulders at the inner extremities of the cutting-points arrest the twine if it reaches them uncut. Curved indentations at the sides of the head give access to the end should its extremity be retained by the knife. The cutting-points are duplicated, as in the illustration, in order that the cutter may be used in whichever position it may be taken up.

In the illustration, a portion of the upper part of the head consists of a hinged knife-holder, 4, in order to provide for using the knife or knives as shears, or for cutting the twine against an abutment. For shearing, the blades may be duplicated at each point, if preferred. The knife-holder is provided with a slightly-beveled shoulder to receive the knife or knives to support them, so that they shall be perpendicular to their abutments 13 when they come in contact therewith. Set-screws are employed to attach the knife or knives, and deep notches or slots are provided for the reception of the screws, to provide for removing and adjusting the knife or knives with facility. A pair of light coil-springs, 14, supported by guide-pins, operate to lift the knife-holder after each depression thereof; and a pair of set-screws, 15, arranged within the same recess beneath the projecting rear edge of the knife-holder, serve in one position (illustrated in Fig. 8) to form gage-stops, by which to regulate the contact of the knife or knives with the cutting abutments, and in another position (illustrated in Figs. 2 and 3) to secure the knife-holder immovably in its upper position.

Fixed or stationary knives are considered preferable, and the ends of the knife or knives, as well as those portions opposed to the abutments, are, by preference, sharpened, so as to provide for cutting the twine by bringing it in contact with any exposed part of the knife. The inner surfaces of the ends of the lateral projections, between and within which the knife or knives are arranged, are beveled or rounded, so as to facilitate introducing the twine, and at the same time the knives are readily arranged so that the contact of the fingers therewith is impossible, and accident from such contact is thus precluded.

Arranged longitudinally within the stock is a thumb-lever, 16, having a central transverse pivot, by which it is attached to the back of the stock, and a head or key end, 17, which projects at the delivery end of the stock at the extremity of the back 1, which is shortened for its accommodation, and beveled, so that the key surface shall always project. The front of the lever 16 is straight and smooth, with the exception of projections 18 19, to form the floor of the twine-passage, and said projections form a narrow guide-groove to confine the twine to a central line or path through the tension devices. The projections 18 are arranged close behind the head of the tension-spring 11, and a lifting-spring, 20, is applied within the back 1, beneath this end of the thumb-lever, to press the latter against the head of the tension-spring, or to support the lever at this point against the pressure of the tension-spring. These springs are, by preference, of equal strength, so as to balance each other with sufficient pressure to attach the twine-cutter, or to hold the twine within the cutter. The receiving-orifice 9 and the guide-groove within the stock are made of sufficient size to accommodate the largest size of twine which will be required, and the tension-spring 11 is provided with a beveled head, and the shoulders formed by the projections 18 19 and the rear end of the thumb-lever are beveled or rounded, so as to preclude knots or snarls catching thereon. By a light pressure with the thumb on the key end 17 of the thumb-lever 16, the rear end of this lever is depressed, and the twine is thus relieved from the holding pressure of the tension-spring 11.

To form a regulating tension, by which the twine may be securely held at will during the operation of wrapping or securing a package, the front piece 3 is provided with a transverse groove to receive the guide projections 19 on the thumb-lever, and the extremity of this part of the stock beyond the groove is made to project sufficiently to form an abutment, 21, within or crossing the guide-groove. This abutment and the head of the tension-spring 11 are, by preference, made broad, as represented, in order to insure their action on the twine. By increasing the pressure on the key end of the thumb-lever after the twine is released, the same may be more securely held between the extremity of the thumb-lever and the abutment 21; or the tension of the twine may be regulated by this means as successfully and with as great facility as by the fingers applied direct, while the fingers are relieved from the cutting friction of the twine. The projection of the abutment 21 and of the head of the tension-spring 11 is made sufficient to retain the twine always between the projections 18 19, or within the guide-groove.

The stock or principal parts of this twine-cutter may be made of any preferred material, such as malleable iron, gutta-percha or hard rubber, bone, ivory, wood, or composition, and if of hard material, as preferred, pads or cushions 22 may be applied to the stock at such points as to form bearings for the same when laid upon the counter, so as to prevent either from being marred by contact. These pads or cushions may consist of pieces of velvet attached by suitable cement.

The attached twine-cutter may be suspended from an elevated twine-holder, if desired, by means of the accessory illustrated in Figs. 9 and 10. This consists of a tension-head, 23, provided with flexible hook-arms 24, to engage with the open-work of the ordinary cast-iron holder, or with any available projections. The twine is threaded through the tension-head, which may be of any preferred construction.

In the illustration a coiled spring is applied to a perforated rod sliding transversely through a frame or ring. A collar or cross-bar is attached adjustably to the rod by a set-screw, and serves to regulate the tension and to form a pressure-bar for use when the twine is uneven or knotted. It is beveled or rounded to pass knots. Smooth twine may be threaded through the eye of the spring-rod.

The improved twine-cutter is adapted to be always found with the twine end being attached thereto, and it is adapted to be employed without previous experience, owing to its simplicity. It will operate perfectly with twine of any size below its maximum, even if knotted, and its use will effect a considerable saving not only in twine, but in the time occupied in doing up a package.

The article may be manufactured in a great variety of styles and sizes, and it is designed for use in all places where cord or twine is used for tying up or securing packages or parcels of groceries, drugs, dry-goods, hardware, &c.

The following is claimed as new:

1. A portable or hand twine-cutter having a holding tension-spring, 11, for attaching it to the twine, in combination with a knife or knives, 12, and a recessed stock, forming a guide-passage for the twine and guards for the knives, substantially as herein shown and described.

2. The thumb-lever 16, with its spring 20, in combination with the recessed stock for releasing the twine from the holding tension, and for holding the twine more or less tightly at will, substantially as set forth.

3. The hinged knife-holder 4, in combination with the knife or knives 12 and the recessed stock, constituting therewith guards for the knives, as described, and having a twine-passage and holding tension, to adapt the knives to act as shears, if desired.

4. The set-screws 15, in combination with the hinged knife-holder 4 and its springs 14 for holding the knives fixedly, or for regulating their movement, as described.

5. The recessed stock having a central longitudinal twine-passage, 9 10, in combination with a knife or knives, 12, having cutting-points at right angles thereto on opposite sides, substantially as herein described, for the purposes set forth.

CHARLES P. ELLIS.

Witnesses:
OCTAVIUS KNIGHT,
WALTER ALLEN.